United States Patent
M. et al.

(10) Patent No.: US 11,263,072 B2
(45) Date of Patent: Mar. 1, 2022

(54) RECOVERY OF APPLICATION FROM ERROR

(71) Applicant: Hewlett-Packard Development Company, L.P., Spring, TX (US)

(72) Inventors: Navin Paul M., Bangalore (IN); Piyush Kumar Jain, Bangalore (IN); Dhananjaya C. K., Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 82 days.

(21) Appl. No.: 16/621,006

(22) PCT Filed: May 7, 2018

(86) PCT No.: PCT/US2018/031314
§ 371 (c)(1),
(2) Date: Dec. 10, 2019

(87) PCT Pub. No.: WO2019/005294
PCT Pub. Date: Jan. 3, 2019

(65) Prior Publication Data
US 2020/0201706 A1    Jun. 25, 2020

(30) Foreign Application Priority Data
Jun. 29, 2017   (IN) .............................. 201741022902

(51) Int. Cl.
G06F 11/00    (2006.01)
G06F 11/07    (2006.01)
G06F 11/32    (2006.01)

(52) U.S. Cl.
CPC ........ *G06F 11/0793* (2013.01); *G06F 11/079* (2013.01); *G06F 11/0748* (2013.01); *G06F 11/0772* (2013.01); *G06F 11/0787* (2013.01); *G06F 11/327* (2013.01)

(58) Field of Classification Search
None
See application file for complete search history.

(56) References Cited

U.S. PATENT DOCUMENTS

| | | | |
|---|---|---|---|
| 5,673,386 A | 9/1997 | Batra | |
| 6,115,643 A * | 9/2000 | Stine | G05B 19/418 700/110 |
| 6,859,834 B1 | 2/2005 | Arora et al. | |
| 6,970,804 B2 | 11/2005 | Siegel et al. | |

(Continued)

OTHER PUBLICATIONS

Google Scholar/Patents—text refined (Year: 2021).*
(Continued)

*Primary Examiner* — Christopher S McCarthy
(74) *Attorney, Agent, or Firm* — HP Inc. Patent Department

(57) ABSTRACT

Aspects of recovery of an application from an error. An error notification is received from an agent associated with an application, the error notification being indicative of an error encountered during execution of the application. The error notification is compared with error patterns stored in a database to determine a matching error pattern. Further, a recovery action is ascertained and the recovery action is provided to the agent to recover the application from the error.

15 Claims, 5 Drawing Sheets

(56) References Cited

U.S. PATENT DOCUMENTS

| | | | |
|---|---|---|---|
| 7,200,779 B1 * | 4/2007 | Coss, Jr. ............. | G06F 11/0709 |
| | | | 700/108 |
| 7,539,277 B2 | 5/2009 | Pattipatti et al. | |
| 9,542,255 B2 | 1/2017 | Fu et al. | |
| 10,120,372 B2 * | 11/2018 | Samantaray ..... | G05B 19/41875 |
| 10,761,974 B2 * | 9/2020 | Hoover ............... | G06F 11/3692 |
| 2003/0061265 A1 | 3/2003 | Maso et al. | |
| 2009/0013208 A1 | 1/2009 | Dimuzio | |
| 2009/0193298 A1 | 7/2009 | Mukherjee | |
| 2010/0083029 A1 * | 4/2010 | Erickson ............. | G06F 11/0709 |
| | | | 714/2 |
| 2010/0235142 A1 | 9/2010 | Jammu et al. | |
| 2014/0108868 A1 | 4/2014 | Neerincx | |
| 2016/0116892 A1 * | 4/2016 | Cheng ................... | G06F 11/079 |
| | | | 700/108 |
| 2018/0203755 A1 * | 7/2018 | Das ...................... | G06F 11/079 |

OTHER PUBLICATIONS

Moreto, M. st al., Using Disturbarce Records to Automate the Diagnosis of Faults and Operational Procedures in Power Generators, Nov. 16, 2015, http://ieeexplore.ieee.org ~ 9 pgs.

\* cited by examiner

RECOVERY OF APPLICATION FROM ERROR

BACKGROUND

Computing devices are often implemented in a networked environment to perform various functions. For this, one or more applications are executed on each computing device. For example, in a manufacturing set-up, there may be multiple computing devices, referred to as manufacturing stations. One or more applications may be executed on each manufacturing station by an operator for operating on components of a device being manufactured or assembled. The operations performed may include, for example, configuring, testing, and repairing the components. In another example, multiple computing devices may be present in a networked environment, such as a distributed computing network, a mobile computing network, and the like. Each computing device may execute one or more applications. At times, an error may occur when an application is being executed at a computing device and as a result, the operations of the computing device may get disrupted until the application recovers from the error.

BRIEF DESCRIPTION OF FIGURES

The detailed description is provided with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
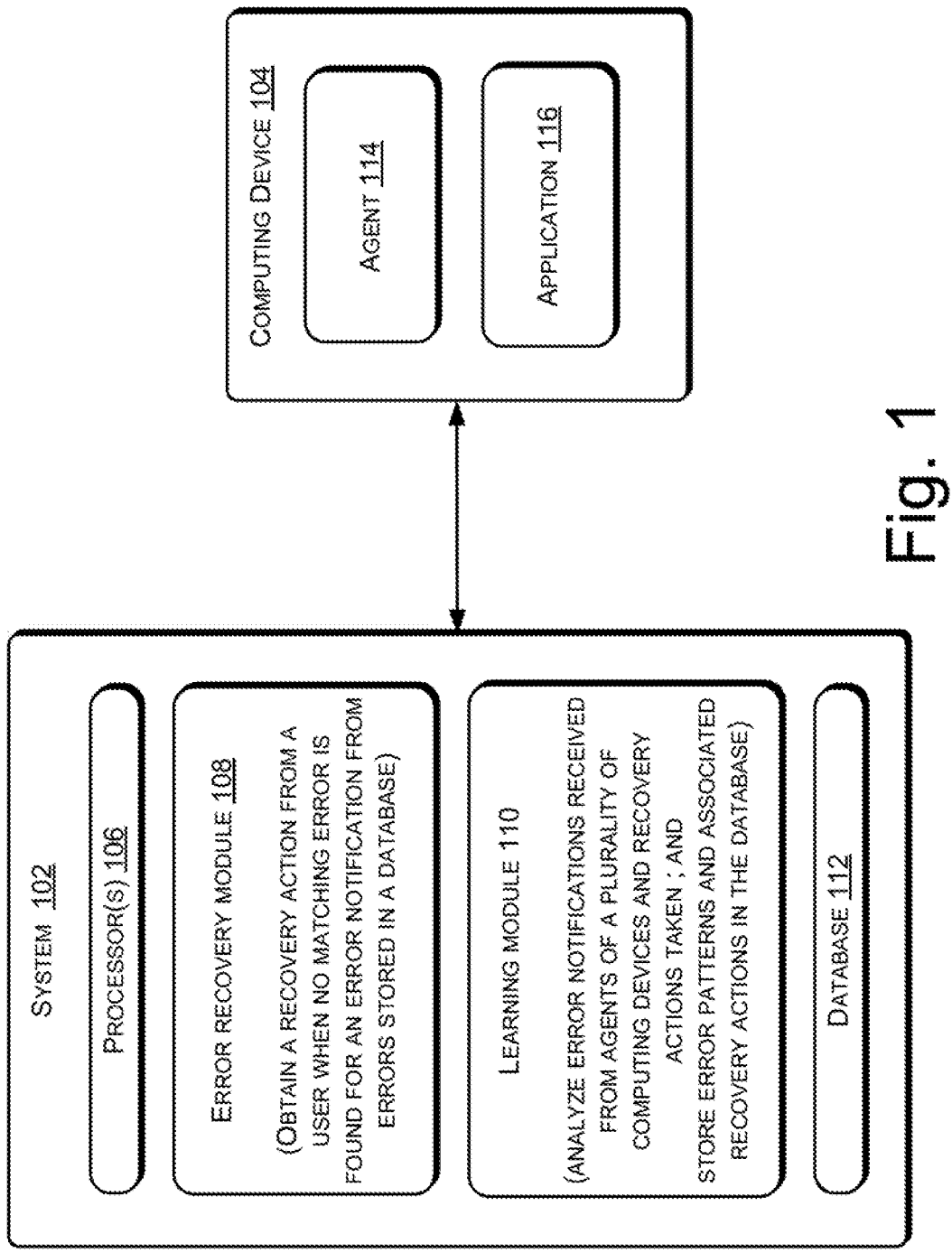
FIG. 1 illustrates an example system for implementing recovery of an application at a computing device, in accordance with principles of the present subject matter.

Aspects of recovery of an application from an error are described herein. Typically, to recover an application from an error and resume operations of the computing device executing the application, an operator of the computing device has to call an expert, such as a service engineer. The expert analyses the error and may provide a recovery solution. In a networked environment, it is possible that similar errors may be encountered during execution of applications at different computing devices in the network at different times. Even in such cases, the expert has to individually provide the solution to recover the application at each computing device. When application error logs are collected remotely, they are generally used to create an update, such as a patch, that is later rolled out to the computing devices after a time lag.

Aspects of the present subject matter are directed to facilitating recovery of an application from an error at a computing device so that operations dependent on the executing application can continue with minimal disruption after an error has occurred. For this, an agent is associated with the application. The agent provides an error notification to a central system, such as a server, upon occurrence of an error. The error notification is compared by the server against error patterns stored in a database to find a matching error pattern. The database also includes a recovery action for each error pattern. The recovery action corresponding to the matching error pattern is sent to the agent to recover the application. In case there is no matching error pattern, an alert is provided to a user, such as a service engineer, who can then provide the recovery action.

In one example, the recovery action may include providing a set of instructions to an operator for recovering the application. In another example, the recovery action may include triggering a set of instructions to be automatically executed, for example, by the application or an operating system, at the computing device for recovering the application. The recovery action performed and the error notification can be stored in the database and can be used for further analysis to identify new error patterns. Further, the central system can provide an alert regarding the criticality level of the error to the user to help prioritize analysis of errors and execution of recovery actions.

The agent used at the computing device can be, for example, a plugin that connects to the central system using web Application Program Interfaces (APIs), such as a light weight REST protocol. As the agent serves to communicate the error notification and receive the recovery action without performing any intermediate analysis, the agent is fast and efficient and not complex. Further, the agent does not have to be updated when new errors are encountered since the central system learns new error patterns and associated recovery actions from the information stored in the database. Also, various reports can be generated by the central system for analysis by the user to identify and resolve systemic errors, monitor health of the network, and the like.

Aspects of the present subject matter are further described in conjunction with FIGS. 1-5. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and implementations of the present subject matter, as well as specific examples thereof, are intended to encompass equivalents thereof.

FIG. 1 illustrates an example system for implementing recovery of an application at a computing device, in accordance with principles of the present subject matter. As shown, system 102 may be communicatively coupled to a computing device 104. The system 102 may be implemented as, for example, a desktop computer, a server, a laptop computer, a mobile device, and the like. Similarly, the computing device 104 may be implemented as any computing device, mobile or fixed. In case of a networked environment, the system 102 may be a central system communicatively coupled with multiple computing devices. For discussion purposes, a single computing device 104 is illustrated the figure.

The system 102 includes a processor 106, an error recovery module 108, a learning module 110, and a database 112. The processor 106 may be implemented as one or more microprocessors, microcomputers, microcontrollers, digital signal processors, central processing units, state machines, logic circuitries, and/or any devices that manipulate signals based on operational instructions. Among other capabilities, the processor 106 fetches and executes computer-readable instructions stored in a memory. The functions of the various elements shown in the figure, including any functional blocks labeled as processor, may be provided through the use of dedicated hardware as well as hardware capable of executing computer readable instructions.

The error recovery module 108 and the learning module 110, collectively referred to as modules, may be coupled to the processor 106, and may include, amongst other things, routines, programs, objects, components, data structures, and the like, which perform particular tasks or implement particular abstract data types. The modules may be implemented as hardware, software, or a combination of the two. The database 112 may serve as a repository for storing data that may be fetched, processed, received, or created by the modules or received from connected computing devices and storage devices. While the database 112 is shown as a part of the system 102, it will be understood that the database 112 may be external to the system 102 and can be accessed by the system 102 using various communication means.

Additionally, the system 102 may include various interfaces, memories, other modules, other data, and the like, which are not shown for brevity. The interfaces may include a variety of computer-readable instructions-based interfaces and hardware interfaces that allow interaction with other communication, storage, and computing devices, such as network entities, web servers, databases, and external repositories, and peripheral devices. The memories may include any non-transitory computer-readable medium including, for example, volatile memory (e.g., RAM), and/or non-volatile memory (e.g., EPROM, flash memory, etc.). The memories may include an external memory unit, such as a flash drive, a compact disk drive, an external hard disk drive, or the like. The other modules may include modules for operation of the system 102, such as operating system, and other applications that may be executed on the system 102. Other data may include data used, retrieved, stored, or in any way manipulated by the other modules.

The computing device 104 may also include processors, interfaces, modules, data, and the like, which are not shown for brevity. Additionally, the computing device 104 includes an agent 114 and an application 116. While the computing device 104 may include multiple applications and an agent corresponding to each application, a single application 116 and corresponding agent 114 have been illustrated for discussion purposes and should not be construed as a limitation. The agent 114 and the application 116 may be coupled to a processor of the computing device 104 and may be implemented as hardware, software, or a combination of the two. Further, the agent 114 and the application 116 may include, amongst other things, routines, programs, objects, components, data structures, and the like, which perform particular tasks or implement particular abstract data types.

In one implementation, the computing device 104 may be a manufacturing station in a computer integrated manufacturing (CIM) environment. As is understood, a CIM environment is an automated environment for integration of components to manufacture an apparatus. For example, when a printer is manufactured in a CIM environment, various components of the printer, such as memory, firmware, power components, electronic components and interfaces, and mechanical components, may be integrated at various stations. During integration, various operations, for example, configuration, testing, and repair, may be performed on the components to ensure that they work as per their respective specification. Accordingly, the application 116 may be a tool used at a computing device 104 for performing one or more operations on a component in an apparatus being manufactured.

During the execution of the application 116 at the computing device 104, an error may be encountered. For example, since the component may be updated or modified over previous versions, the application 116 may not be executing an appropriate script to configure or test the component. As a result, the operation at the computing device 104 may get disrupted until the application is recovered. As will be understood, recovery of the application may include one or more of re-starting the application, updating the script being run by the application, updating the application, changing component specifications used by the application, changing a sequence of steps carried out by the application, and the like.

The agent 114 can be, for example, a plugin that listens to events related to the application 116 at the computing device 104 and communicates the events to the system 102. The agent 114 may connect to the system 104 using Web Application Programming Interfaces (APIs), such as light weight REST protocols, to facilitate fast and reliable communication. In one example, the agent 114 may send a notification to the error recovery module 108 to indicate that an error has been encountered during the execution of the application 116. In another example, the agent 114 may send notifications of various events that may occur during the execution of the application 116, including error and non-error events, to the error recovery module 108. The error recovery module 108 may then determine whether the event is an error. The error recovery module 108 may ignore the notification if the event is not an error or may take appropriate action on the event if it is an error. For ease of discussion, a notification corresponding to an error is referred to as an error notification.

Upon receiving the error notification, the error recovery module 108 may compare the error notification with error patterns stored in the database 112 to determine whether a matching error pattern is present in the database 112. Error pattern can include an identification of the error, the application 116, etc. The error patterns may be learned from previously stored error notifications, as will be discussed later. It will be understood that in some implementations, the error recovery module 108 may seek to match the error notification with previous error notifications stored in the database 112, and such comparison is also included within the scope of determining a matching error pattern. Thus, in such implementations, the stored error patterns may include the error notifications previously received.

In case a matching error pattern is found, the error recovery module 108 may obtain a recovery action corresponding to the matching recovery pattern from the database 112 and may send the recovery action to the agent 114. The agent 114 can provide the recovery action to the application 116, where, based on the recovery action to be taken, the application 116 may display a set of instructions to the operator for execution or may trigger execution of a set of instructions for recovery of the application 116.

However, in case a matching error pattern is not found in the database 112, the error recovery module 108 may send an alert to a user. The user may be, for example, a service engineer or an expert monitoring the system 102 and the alert may be a message displayed on the system 102. In another example, the alert may be an email message sent to an email id of the user or a message sent to a mobile device of the user to notify the user of the error. The error recovery module 108 may also determine a criticality of the error and notify the user of the criticality as a part of the alert. In one example, the criticality of the error may be determined based on a type of error and a frequency of occurrence of that type of error.

The error recovery module 108 may then obtain the recovery action from the user and may provide the recovery action to the agent 114 for recovery of the application as discussed above.

Further, the learning module 110 may store the error notification in the database 112 with the corresponding recovery action obtained from the user or from the database 112. In one example, when there is a plurality of computing devices communicatively coupled to the system 102, the learning module 110 may store error notifications received from agents in each of the plurality of computing devices and recovery actions associated with the error notifications in the database 112. The learning module 110 may implement deep learning techniques to analyze the error notifications to learn error patterns and may store the error patterns along with associated recovery actions in the database 112 for subsequent use.

As is understood, deep learning uses multi-layered hierarchical neural networks to identify patterns. In the present subject matter, for example, each error and consequently each error notification may be associated with parameters, such as application related parameters, component related parameters, and computing device related parameters. For example, application related parameters may identify the application being executed and the type of error encountered; the component related parameters may identify the component and the operation that was being performed by the application at the time of the error; and the computing device related parameters may identify the resources, such as processor, memory, operating system and other resources, available with the computing device. Based on the parameters, error patterns may be identified, for example, by identifying the common parameters that are present when a particular error occurs at different times. Accordingly, over time, the learning module 110 in the system 102 can learn error patterns and associate the error patterns with recovery actions that were taken. Thus, the parameters in the error notification may be compared with parameters in the error patterns stored in the database 112 to determine the matching error pattern.

Further, the system 102 may also generate reports at specified time intervals or on receiving a user request. The reports may provide information, such as types of errors encountered, number and frequency of errors, criticality of errors, the user who acted on the errors, and the like.

Aspects of implementation of recovery of application from an error will now be described with reference to an example CIM environment for printer manufacture. It will, however, be understood that the present subject matter is not limited to this example but is applicable for recovery of any application in any networked environment and hence all such implementations are intended to be covered within the scope of the present subject matter.

Figure 2:
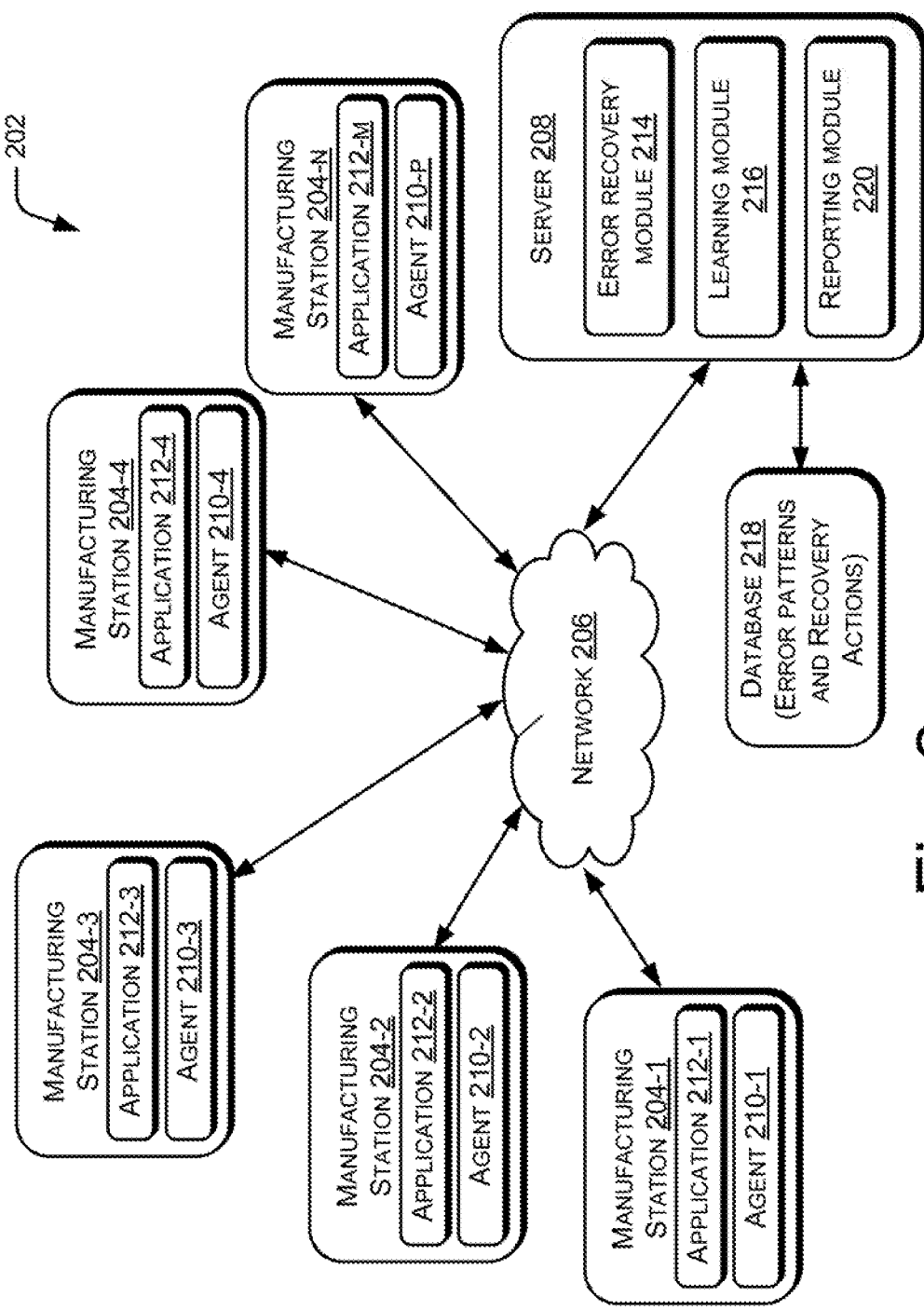
FIG. 2 illustrates an example environment for implementing recovery of an application, in accordance with principles of the present subject matter.

FIG. 2 illustrates an example environment 202 for implementing recovery of an application, in accordance with principles of the present subject matter. The environment 202 may correspond to a CIM set-up for printer manufacture. The environment 202 includes a plurality of manufacturing stations 204-1, 204-2 . . . 204-n, individually referred to as a station 204. The manufacturing stations 204-1, 204-2 . . . 204-n, are communicatively coupled through a network 206 with a central system, such as the server 208.

For example, station 204-1 may be a power component station and may be used for reflash and power up operations, station 204-2 may be a mechanical component station, station 204-3 may be a repair station, station 204-4 may be a scanner and paper feed station, and so on. Similarly, there may be an end of line station, a packaging and shipping station, etc. Further, there may be multiple stations to perform similar functions. For example, there may be multiple repair stations or multiple mechanical component stations, and the like. Further, one or more components may be operated upon at each station 204.

Each manufacturing station 204 may be implemented as a computing device and may include processor, memory, interfaces, etc., as discussed earlier with reference to computing device 104. Also, each manufacturing station 204 may include one or more applications, such as application 212-1, 212-2 . . . 212-m, individually referred to as application 212, to operate upon the one or more components. Each application 212 can be associated with an agent, such as agent 210-1, 210-2 . . . 210-p, individually referred to as agent 210. In one example, each application 212 may be associated with a respective agent 210. In another example, two or more applications may share an agent 210. However, for illustration purposes and not as limitation, each station 204 is shown as including an application 212 and an agent 210.

The network 206 may be a wireless network, a wired network, or a combination thereof. The network 206 can also be an individual network or a collection of many such individual networks, interconnected with each other and functioning as a single large network, e.g., the Internet or an intranet. The network 206 can include different types of networks, such as intranet, local area network (LAN), wide area network (WAN), the internet, and such. The network 206 may also include individual networks, such as, but not limited to, Global System for Communication (GSM) network, Universal Telecommunications System (UMTS) network, Long Term Evolution (LTE) network, etc. Accordingly, the network 206 includes various network entities, such as base stations, gateways, servers, and routers; however, such details have been omitted to maintain the brevity of the description.

In one implementation, while the application 212 is being executed at station 204, an error may be encountered and the agent 210 may provide an error notification to the server 208. The server 208 can be implemented as a computing system and may include processor, memory, interfaces, etc., as discussed earlier with reference to system 102. Further, the server 208 may include an error recovery module 214 and a learning module 216, which may be respectively similar to the error recovery module 108 and the learning module 110 discussed earlier. The server 208 is also associated with a database 218 that includes at least error notifications, error patterns, and recovery actions. While the database 218 is shown external to the server 208, it will be understood that in different implementations it may be partly or wholly hosted in the server 208.

Consider an example where a station 204 is a reflash station where the application 212 is responsible for reflashing firmware on a printer board. Reflashing includes writing or updating data in memory, such as flash memory, of the firmware. In this case, the component being operated upon is a printer board. During execution of the application 212, an error may occur, for example, when the application 212 is unable to communicate with the printer board over a communication channel, such as a Universal Serial Bus (USB), after reflashing.

The communication error may occur, for example, if the region settings are not properly set in the printer board before the reflashing. Generally, based on regulatory guidelines or commercial considerations, a printer being manufactured for sale in one region may have different settings from a printer being manufactured for sale in another region. The settings may be stored as region settings in each printer. Accordingly, the script used for reflashing will have to vary. However, if the region settings are not correctly set, then the reflashed firmware will be incompatible with the region settings and can lead to loss in communication upon reflashing.

In the above example, the agent 210 will send an error notification to the error recovery module 214 indicating that after reflash, the application 212 is unable to communicate with the printer board over a USB channel. The error recovery module 214 can determine from the database 218 whether a similar error was encountered earlier, based on a comparison of the error notification with the stored error patterns, and what recovery action was taken. For example, the error recovery module 214 can find that a recovery action exists in the database 218 for a matching error pattern. The recovery action can be to execute diagnostic commands at the station 204 to reset invalid region settings and then reflash the printer board. In this example, the recovery action can be sent to the agent 210 which will provide the recovery action to the application 212 for execution and recovery from the error. In other examples, the recovery action may be displayed to the operator at the station 204 who may then execute the recovery action.

Another example of an error notification may include an indication that the application 212 is unable to communicate with a printer after complete assembly of the printer and a recovery action can include reinitializing communication drivers at the station 204.

In one implementation, upon receiving the error notification, the error recovery module 214 may also display the error notification on a display device associated with the server 208 to alert a user of the error. The user can be a service engineer or a technical expert monitoring the errors in the environment 202. The error recovery module 214 may additionally display a criticality level of the error corresponding to the error notification on the display.

The criticality level of the error may be determined by the error recovery module 214 based on the type of error and frequency of error. Types of high criticality level errors may include repeated errors and recurring errors. For example, if the error is a repeated error for which no matching error pattern was found in the database 218, then it may be provided with a high criticality level. In another example, if the error recurs on the same station in the same operating cycle, it may be provided a high criticality level. Considering the above example of firmware reflashing, if after resetting the region setting, the application 212 encounters the same error of being unable to communicate with the printer board over USB channel, then the error may be provided with a high criticality level. In yet another example, if the error occurs frequently when operations are performed on different apparatuses, then it may be provided a high criticality level.

On the other hand, in case of an error that is, for example, resolved based on the recovery action that was provided or that does not occur frequently, the error may be provided a low criticality level. It will be understood that the basis on which the criticality level is to be determined may be configurable and different users may configure different rules in the error recovery module 214 for determination of the criticality level.

Further, the learning module 216 may store the error notification and the recovery action in the database 218 and may apply deep learning techniques to identify new error patterns and associated recovery actions. As there may be a plurality of stations 204 in the environment 202, the learning module 216 can more efficiently learn new error patterns and associated recovery actions. The new error patterns and associated recovery actions may also be stored in the database 218 for subsequent use.

As the learning module 216 saves each error notification and recovery action in the database 218, each time a new error notification is received, the error recovery module 214 can determine the type and frequency of occurrence of the error from the database 218 to determine the criticality level.

In addition to displaying the error notification and the criticality level of the error in the alert, the error recovery module 214 can also display whether a matching error pattern was found and/or a recovery action was identified from the database 218 for the error notification. Further, the alert can be additionally or alternatively provided as an email message or a message to a mobile device of the user.

For instance, in the above example related to reflashing firmware, in case the error recovery module 214 is unable to find a matching error pattern, the error recovery module 214 can notify the user through the alert. Accordingly, the user can provide the recovery action and can prioritize providing of the recovery action based on the criticality level in case multiple error notifications are to be attended to. In case a plurality of users are available for attending to the error notification, the error recovery module 214 can further select the appropriate user to whom the error notification should be assigned for providing the recovery action. The selection of the appropriate user can be based on, for example, the component being operated on or the type of error. Further, the learning module 216 can also store the identity of the user, such as user name or user id, in the database to identify the user who was assigned the error notification for providing the recovery action.

The server 208 can also provide various reports to the user for analysis of the error notifications received, recovery actions taken, frequently encountered error patterns, users to whom the error notifications were assigned for action, and the like. For this, the server 208 can include a reporting module 220 which can retrieve and analyze data from the database 218 for providing the reports. The reports may be generated based on the error notifications, error patterns, and the recovery actions stored in the database 218. The reports may be displayed on the display device or may be sent as documents through electronic communication channels.

Thus, by implementing various aspects of the present subject matter, applications can be efficiently and reliably recovered after an error is encountered and the operations at the station 204 can continue with minimal disruption. The methods used for the application recovery as discussed above will now be further described with reference to FIGS. 3 and 4.

Figure 3:
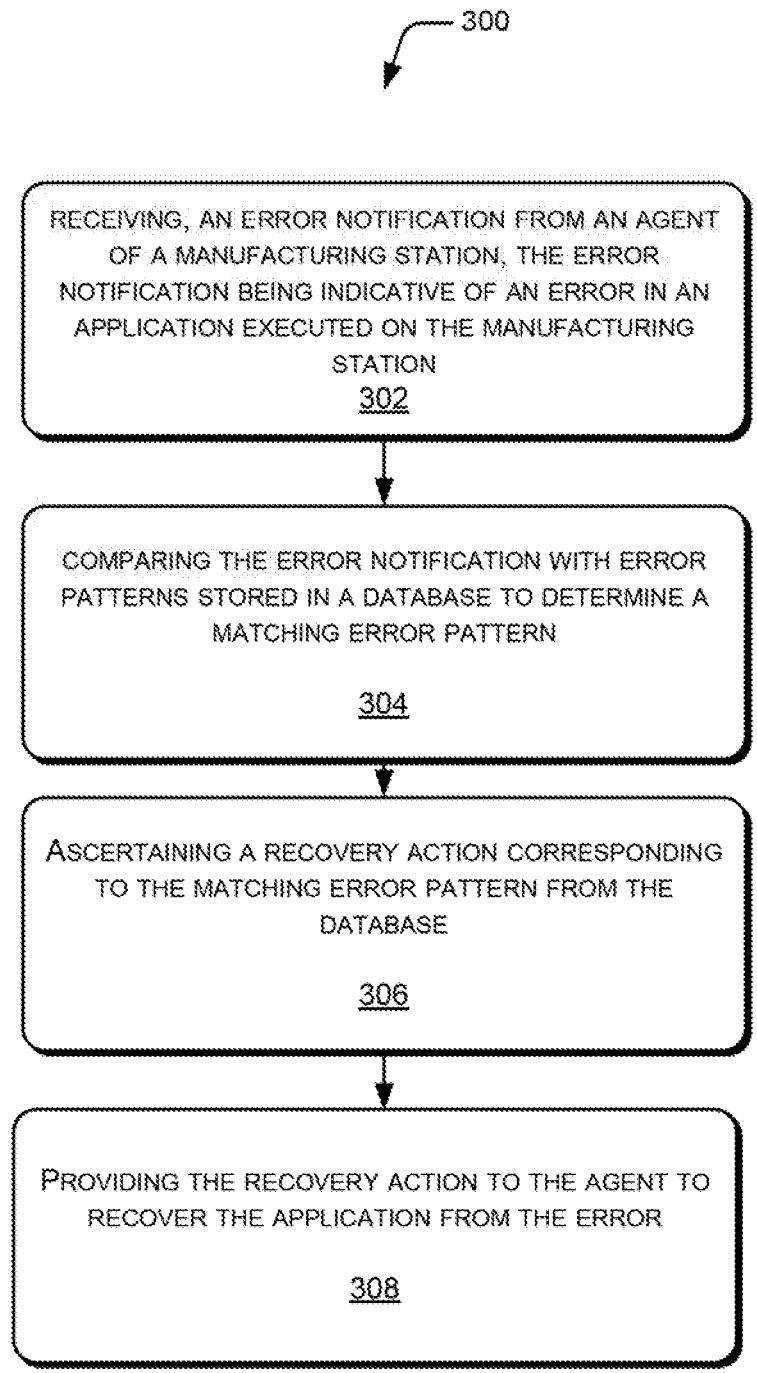
FIG. 3 illustrates an example method for application recovery, in accordance with principles of the present subject matter.
Figure 4:
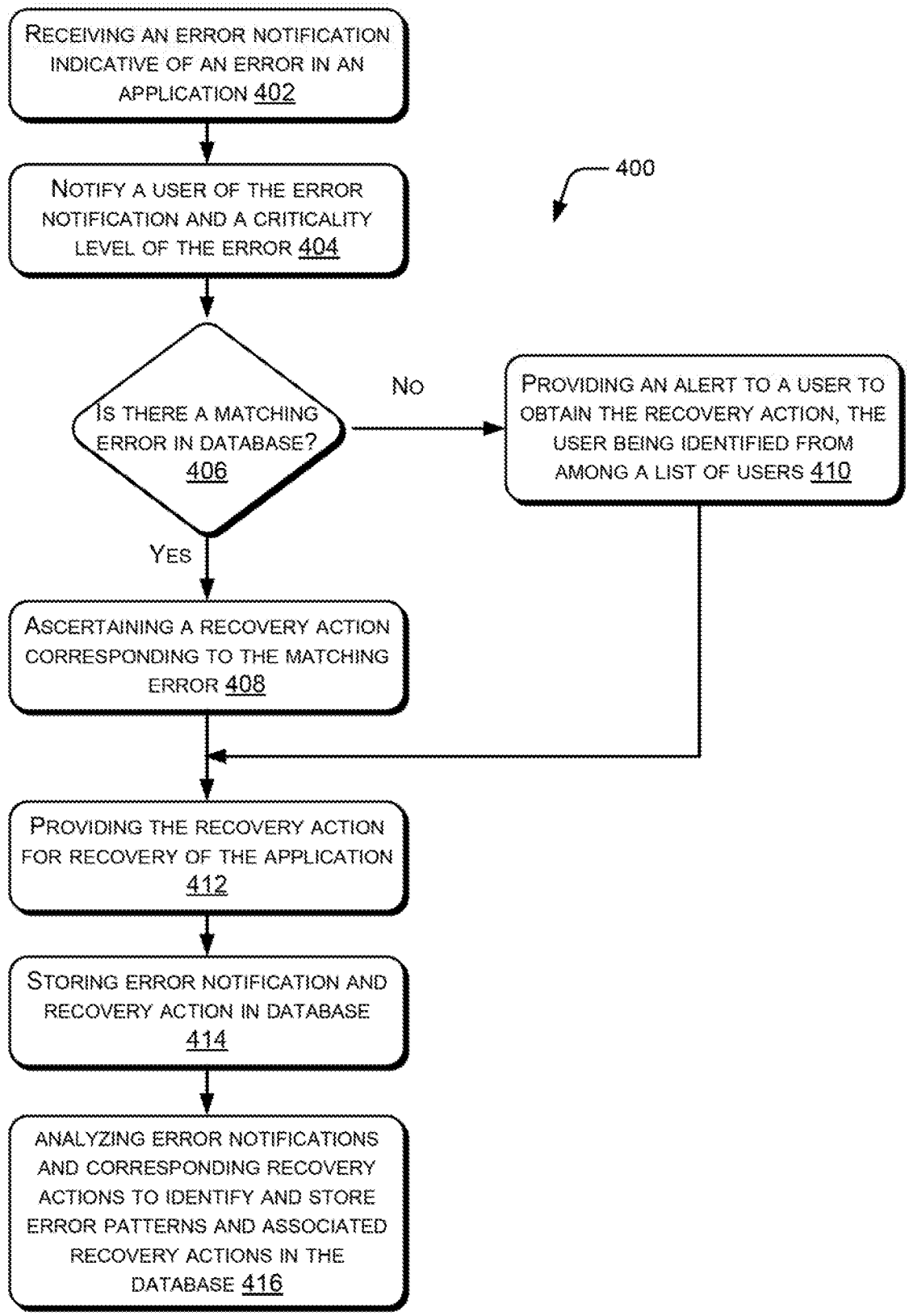
FIG. 4 illustrates another example method for application recovery, in accordance with principles of the present subject matter.

FIG. 3 illustrates an example method for application recovery, in accordance with principles of the present subject matter. FIG. 4 illustrates another example method for application recovery, in accordance with principles of the present subject matter. The order in which the methods 300 and 400 are described is not intended to be construed as a limitation, and any number of the described method blocks can be combined in any order to implement methods 300 and 400, or an alternative method. Additionally, individual blocks may be deleted from the methods 300 and 400 without departing from the spirit and scope of the subject matter described herein. Furthermore, the methods 300 and 400 may be implemented in any suitable hardware, computer readable instructions, firmware, or combination thereof. For discussion, the methods 300 and 400 are described with reference to the implementations illustrated in FIGS. 1 and 2.

A person skilled in the art will readily recognize that steps of the methods 300 and 400 can be performed by programmed computers. Herein, some examples are also intended to cover program storage devices and non-transitory computer readable medium, for example, digital data storage media, which are computer readable and encode computer-executable instructions, where said instructions perform some or all of the steps of the described methods 300 and 400. The program storage devices may be, for example, digital memories, magnetic storage media, such as magnetic disks and magnetic tapes, hard drives, or optically readable digital data storage media.

With reference to method 300, as illustrated in FIG. 3, at block 302 an error notification is received from an agent of a manufacturing station, the error notification being indicative of an error in an application executed on the manufacturing station. For example, the error recovery module 214 may receive an error notification from the agent 210 when an error is encountered during execution of the application 212. At block 304, the error notification is compared with error patterns stored in a database to determine a matching error pattern. For example, the error recovery module 214 may compare the error notification with error patterns stored in the database 218.

In one example, the application may correspond to a component configuration, testing, and repair application and the error notification includes parameters indicative of the component being operated upon and the application being executed. Further, an error pattern from among the error patterns stored in the database is determined to be the matching error pattern when a subset of the parameters of the error notification match with a corresponding subset of parameters of the error pattern.

At block 306, a recovery action corresponding to the matching error pattern is ascertained from the database. For example, the error recovery module 214 may ascertain the recovery action from the database 218. At block 308, the recovery action is provided to the agent for execution on the manufacturing station to recover the application from the error. For example, the error recovery module 214 may provide the recovery action to the agent 210 for recovery of the application 212. The agent 210 may trigger execution of the recovery action or may provide it to an operator for execution.

In case the error recovery module 214 is unable to ascertain the recovery action from the database 218, it may provide an alert to a user as will be discussed further with reference to FIG. 4.

With reference to method 400, as illustrated in FIG. 4, at block 402, an error notification indicative of an error in an application is received. For example, the error recovery module 214 on the server 208 may receive an error notification indicative of an error in an application 212 executed on a station 204. The error notification may be received from an agent 210 associated with the application 212. At block 404, a user is notified of the error notification and a criticality level of the error. For example, the error recovery module 214 may notify a user by displaying the error notification and the criticality level of the error on a display device. In another example, the user may be notified through an email message or a message sent to a mobile device of the user.

At block 406, it is determined if there a matching error in database. For example, the error recovery module 214 may determine whether there is a matching error in the database 218. If yes, then at block 408, a recovery action corresponding to the matching error is ascertained form the database. However, if no matching error patter was found at block 406, then the method continues to block 410, where an alert is provided to a user to obtain the recovery action. In one example, the user may be identified from among a list of users. For example, the error recovery module 214 may identify a user from a list of users, based on the type of error and expertise of the user, for providing the alert. The user can then provide the recovery action to the error recovery module 214 for example, through an interface on the server 208.

From blocks 408 and 410, once the recovery action has been determined either from the database or from the user, the method 400 proceeds to block 412 where the recovery action is provided to the agent for recovery of the application. For example, the recovery action may be provided to the agent 210 at the station 204 to recover the application 212. Additionally, at block 414, the error notification and the recovery action are stored in the database. Further, at block 416, the error notifications and corresponding recovery actions are analyzed to identify and store error patterns and associated recovery actions in the database. For example, the learning module 216 may analyze the error notifications and the recovery actions to identify and store the error patterns in the database 218.

Figure 5:
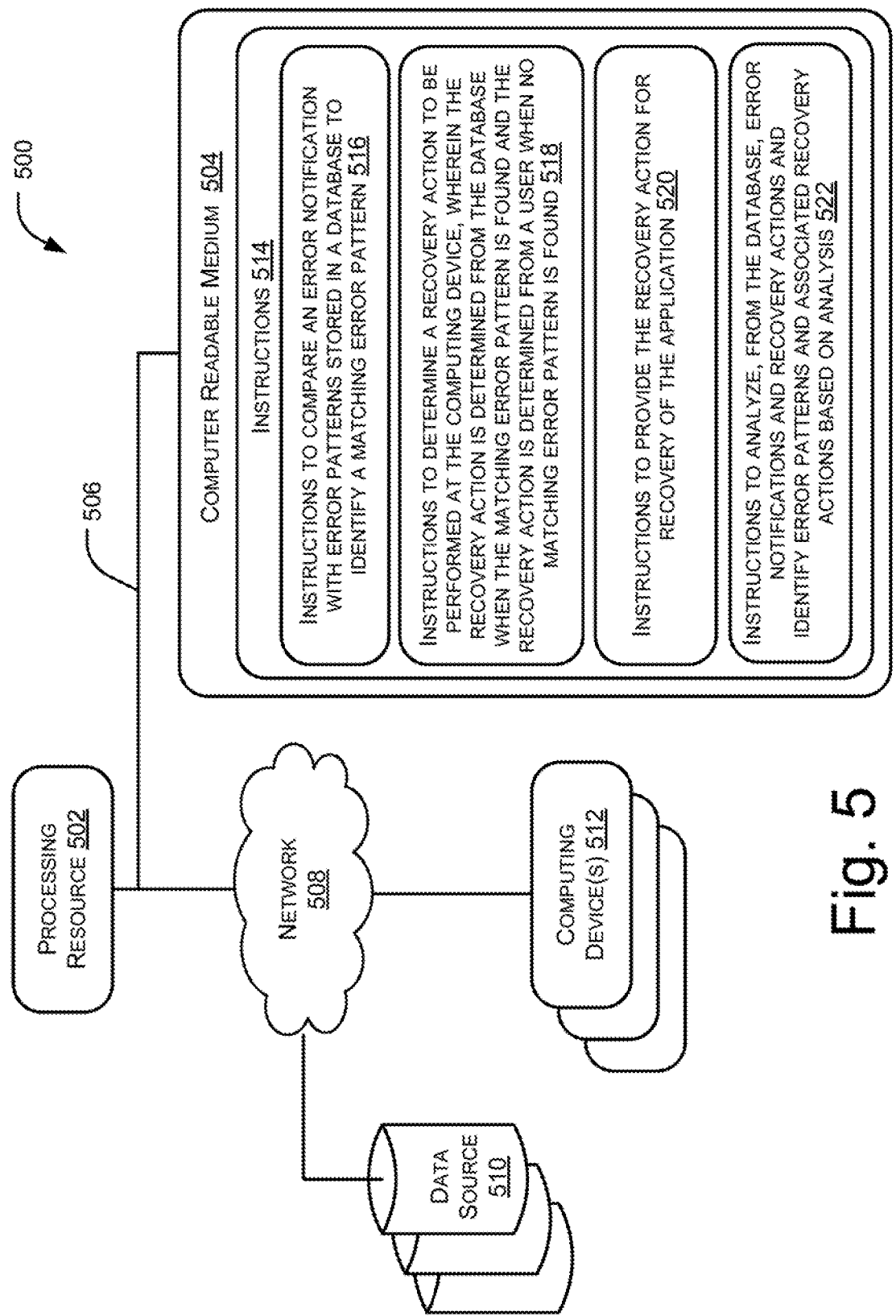
FIG. 5 illustrates an example computer readable medium implementation for application recovery, in accordance with principles of the present subject matter.

FIG. 5 illustrates an example computer readable medium implementation for application recovery, in accordance with principles of the present subject matter. A network environment 500 may comprise at least a portion of a public networking environment or a private networking environment, or a combination thereof. In an implementation, the network environment 500 includes a processing resource 502 communicatively coupled to a non-transitory computer readable medium 504 through a communication link 506. In an example, the processing resource 502 may include one or more processors of a computing system, such as of the system 102, as described earlier, for recovery of an application. The non-transitory computer readable medium 504 can be, for example, an internal memory device of the computing system or an external memory device. In an implementation, the communication link 506 may be a direct communication link, such as any memory read/write interface. In another implementation, the communication link 506 may be an indirect communication link, such as a network interface. In such a case, the processing resource 502 can access the non-transitory computer readable medium 504 through a network 508. The network 508 may be a single network or a combination of multiple networks and may use a variety of different communication protocols.

The processing resource 502 and the non-transitory computer readable medium 504 may also be coupled, over the communication link 506 and/or network 508*t, o* data source 510, such as databases that store error notifications, error patterns, and recovery actions, and to computing device(s) 512, such as manufacturing stations, that execute applications.

In an implementation, the non-transitory computer readable medium 504 includes a set of computer readable instructions for recovery of an application that encounters an error at a computing device 512. The set of computer readable instructions, referred to as instructions 514 hereinafter, can be accessed by the processing resource 502 and executed for application recovery in accordance with the principles of the present subject matter.

In an example, the instructions 514 include instructions 516 that cause the processing resource 502 to compare an error notification with error patterns stored in a database, such as data source 510, to identify a matching error pattern. The error notification may be received from an agent associated with the application being executed at a computing device 512. Further, instructions 514 include instructions 518 to determine a recovery action to be performed. The recovery action is determined from the database when the matching error pattern is found. On the other hand, the recovery action is determined from a user when no matching error pattern is found.

The instructions 514 also include instructions 520 to provide the recovery action to the agent for recovery of the application and to store the error notification and the recovery action in the database. The instructions 514 further include instructions 522, to analyze error notifications and recovery actions, from the database, and identify error patterns and associated recovery actions based on the analysis.

The instructions 514 can include further instructions, such as for determining a criticality level of the error indicated in the error notification, generating reports, and the like, as described earlier.

Although implementations for recovery of application from an error have been described in language specific to structural features and/or methods, it is to be understood that the invention is not necessarily limited to the specific features or methods described. Rather, the specific features and methods are disclosed and explained in the context of a few example implementations.

We claim:

1. A method comprising:
   receiving, by a server, an error notification from an agent at a manufacturing station connected to the server over a network, the error notification being indicative of an error in an application being executed on the manufacturing station;
   comparing, by the server, the error notification with error patterns stored in a database to determine a matching error pattern;
   ascertaining, by the server, a recovery action corresponding to the matching error pattern from the database, wherein the recovery action includes a set of instructions to recover the application from the error;
   providing, by the server, the recovery action to the agent to recover the application from the error;
   triggering, by the agent, the recovery action by automatically executing the set of instructions to recover the application from the error;
   selecting, by the server, a user from a list of users based on a type of the error; and
   providing, by the server, an alert to the user to obtain the recovery action from the user when no matching error pattern is found for the error notification.

2. The method as claimed in claim 1, further comprising storing, by the server, the error notification in the database along with the corresponding recovery action obtained from the user.

3. The method as claimed in claim 1, wherein providing the recovery action comprises providing the set of instructions to be executed by an operator of the manufacturing station in response to the set of instructions not being automatically executed.

4. The method as claimed in claim 1, wherein the application is to perform operations on a component and the error notification comprises parameters related to the component and the application.

5. The method as claimed in claim 4, wherein an error pattern from among the error patterns stored in the database is determined to be the matching error pattern when a subset of the parameters of the error notification match with a corresponding subset of parameters of the error pattern.

6. The method as claimed in claim 1, further comprising, determining, by the server, a criticality level of the error notification and notifying the user of the criticality level.

7. The method as claimed in claim 1, further comprising analyzing, by the server, error notifications received from agents of a plurality of manufacturing stations and recovery actions corresponding to the error notifications to identify and store error patterns and associated recovery actions in the database.

8. A system comprising:
   a processor;
   an error recovery module coupled to the processor, wherein the error recovery module is to:
      receive an error notification from an agent of a computing device, the error notification being indicative of an error in an application being executed at the computing device;
      compare the error notification with error patterns stored in a database to determine whether a matching error pattern exists;
      ascertain a recovery action corresponding to the matching error pattern in response to the error notification matching the matching error pattern, wherein the recovery action includes a set of instructions to recover the application from the error;
      obtain the recovery action from a user when no matching error pattern is found for the error notification from among error patterns stored in the database, wherein the user is selected from a list of users based on a type of the error; and
      provide the recovery action to the agent for recovery of the application to cause automatic execution of the set of instructions to recover the application from the error; and
   a learning module coupled to the processor, wherein the learning module is to:
      analyze error notifications received from agents of a plurality of computing devices and recovery actions taken for the error notifications; and
      store error patterns and associated recovery actions, identified based on the analysis, in the database.

9. The system as claimed in claim 8, wherein the error recovery module is to:
   compare parameters of the error notification with parameters of the errors stored in the database to identify a matching error, wherein the parameters include computing device related parameters and application related parameters; and
   provide the recovery action corresponding to the matching error to the agent to recover the application.

10. The system as claimed in claim 8, wherein the error recovery module is to determine a criticality level of the error notification based on the type of the error and a frequency of occurrence of that type of error.

11. The system as claimed in claim 8, further comprising a reporting module to generate a report based on the error notifications, error patterns, and the recovery actions.

12. A non-transitory computer readable medium comprising instructions that, when executed, cause a processor to:
compare an error notification received from an agent of a computing device with error patterns stored in a database to identify a matching error pattern, wherein the error notification comprises parameters related to an application being executed on the computing device;
determine a recovery action to be performed at the computing device for recovery of the application, wherein:
the recovery action includes a set of instructions to recover the application from error;
the recovery action is determined from the database when the matching error pattern is found; and
the recovery action is determined from a user, selected from a list of users based on a type of the error, when no matching error pattern is found;
provide the recovery action to the agent for recovery of the application to cause automatic execution of the set of instructions to recover the application from the error;
analyze, from the database, error notifications received from agents of a plurality of computing devices and recovery actions taken for the error notifications; and
identify error patterns and associated recovery actions based on analysis.

13. The non-transitory computer readable medium as claimed in claim 12, further comprising instructions that, when executed, cause the processor to:
determine a criticality level of the error notification based on the type of the error and a frequency of occurrence of that type of error in the error notifications received from the agents of the plurality of computing devices; and
notify the user of the criticality level.

14. The non-transitory computer readable medium as claimed in claim 13, further comprising instructions that, when executed, cause the processor to determine the criticality level to be a high criticality level based on the error being repeated and no matching error pattern being found in the database for the repeated error.

15. The non-transitory computer readable medium as claimed in claim 13, further comprising instructions that, when executed, cause the processor to determine the criticality level to be a low criticality level based on a matching error pattern having been found in the database for the error and the recovery action being provided.

\* \* \* \* \*